United States Patent
Furukawa et al.

(10) Patent No.: US 7,907,797 B2
(45) Date of Patent: Mar. 15, 2011

(54) IMAGE PROCESSING APPARATUS

(75) Inventors: Naohiro Furukawa, Tachikawa (JP); Yoshiaki Toyota, Hachioji (JP); Hisashi Ikeda, Kunitachi (JP); Takeo Shiba, Kodaira (JP); Yo Takeuchi, Ikoma (JP)

(73) Assignee: Hitachi, Ltd., Tokyo (JP)

( * ) Notice: Subject to any disclaimer, the term of this patent is extended or adjusted under 35 U.S.C. 154(b) by 1023 days.

(21) Appl. No.: 11/631,936

(22) PCT Filed: Aug. 4, 2004

(86) PCT No.: PCT/JP2004/011496
§ 371 (c)(1),
(2), (4) Date: Jan. 9, 2007

(87) PCT Pub. No.: WO2006/013639
PCT Pub. Date: Feb. 9, 2006

(65) Prior Publication Data
US 2007/0253600 A1 Nov. 1, 2007

(51) Int. Cl.
*G06K 7/00* (2006.01)
*G09G 5/00* (2006.01)
*H04N 1/387* (2006.01)

(52) U.S. Cl. .......... 382/312; 345/660; 358/452

(58) Field of Classification Search .......... 382/112, 382/282, 296, 298, 302, 305, 309, 312, 321; 358/1.2, 1.16, 452, 528, 537, 448, 451, 478; 345/180, 530, 649, 660, 418, 629, 650
See application file for complete search history.

(56) References Cited

U.S. PATENT DOCUMENTS

| | | | |
|---|---|---|---|
| 5,583,665 A * | 12/1996 | Gregory et al. | 358/504 |
| 5,742,279 A | 4/1998 | Yamamoto et al. | |
| 6,408,301 B1 * | 6/2002 | Patton et al. | 1/1 |
| 2003/0197716 A1 * | 10/2003 | Krueger | 345/629 |

(Continued)

FOREIGN PATENT DOCUMENTS

JP 07-129749 11/1993

(Continued)

OTHER PUBLICATIONS

Nikkei Electronics, "Targeting Print Quality Reducing Fatigue by Increasing Reflectivity", Jul. 21, 2003, pp. 114-122 in Japanese, and English translation, 18 pages.

(Continued)

*Primary Examiner* — Kanji Patel
(74) *Attorney, Agent, or Firm* — Stites & Harbison, PLLC; Juan Carlos A. Marquez, Esq.

(57) ABSTRACT

This invention provides an efficient image processing apparatus having merits as the handiness and visibility of paper and the multi-functionality of a computer, enabling trial and error with paper media without capturing all images previously. The apparatus comprises an image capturing unit for electronically capturing paper images by a photo-sensor; an image editing unit for editing such as clipping of partial image or scaling; a user interface unit for receiving user's commands regarding the image editing; an image memory unit for storing; and an image display unit for displaying the images in the image memory unit. An image displaying function is provided on a transparent plane. Photo-sensors are on the plane, and image capturing unit and image display unit are integrated to form an image capturing and display unit. A user gains an operability compatible with human instinct, ignoring a difference between paper and electronic medium.

15 Claims, 10 Drawing Sheets

U.S. PATENT DOCUMENTS

2004/0056883 A1* 3/2004 Wierowski .................... 345/719
2004/0228613 A1* 11/2004 Lin et al. ......................... 386/52

FOREIGN PATENT DOCUMENTS

| JP | 09-321939 | 5/1996 |
| JP | 11-065763 | 8/1997 |
| JP | 2002-237923 | 2/2001 |
| JP | 2004-165978 | 11/2002 |
| JP | 2004-165978 A | 6/2004 |
| TW | 325545 | 1/1998 |

OTHER PUBLICATIONS

Office Action from Republic of China Patent Office for Application No. 094121206, mailed on Nov. 24, 2010.

* cited by examiner

| # | ICONS | OPERATIONS | MEANINGS |
|---|---|---|---|
| 1 |  | DEFINE AREA | SPECIFYING THE DEFINED AREA |
| 2 |  | MOVE | MOVING THE DEFINED AREA |
| 3 |  | RESIZE | RESIZING THE DEFINED AREA |
| 4 |  | ROTATE | ROTATING THE DEFINED AREA |
| 5 |  | DRAW | ADDING HAND-WRITTEN STROKES |
| 6 |  | SAVE | STORING THE IMAGE WITHIN THE DEFINED AREA |
| 7 |  | LOAD | DOWNLOADING AND DISPLAYING THE STORED IMAGE |
| 8 |  | DELETE | DELETING THE DEFINED AREA OR THE STORED IMAGE |
| 9 |  | UNDO | UNDOING THE LAST OPERATION |

| IMAGE ID | I2203010 | 1111 |
| --- | --- | --- |
| FILE NAME | temp_20040321_123456 | 1112 |
| IMAGE WIDTH (w) | 120 | 1113 |
| IMAGE HEIGHT (h) | 180 | 1114 |
| TOP-LEFT POINT (x-AXIS) | 200 | 1115 |
| TOP-LEFT POINT (y-AXIS) | 80 | 1116 |
| ROTATION ($\theta$) | 0° | 1117 |
| SCALING (x-AXIS) | 100.0 % | 1118 |
| SCALING (y-AXIS) | 100.0 % | 1119 |
| IMAGE DATA | (BINARY DATA) | 1120 |

IMAGE PROCESSING APPARATUS

TECHNICAL FIELD

This invention relates to an apparatus for processing image data, and more particularly to an image processing apparatus which is well suited for supporting the collecting, editing and organizing of images appearing on a paper sheet or paper-like medium on which characters, drawings or pictures are printed, such as documents, magazines or newspapers.

BACKGROUND ART

Paper is one of the handiest and most convenient media for human beings even today when the development of electronics is exploding. As mentioned in the non-patent document 1 paper has several merits: it can be easily viewed; it seldom causes fatigue; and one can add his/her notes or comments on it with freedom. This handiness of paper has long let people clip out interesting pieces of news or photos and paste them on the pages of a notebook with their remarks or comments jotted down nearby.

On the other hand, paper has demerits, too: the larger is the quantity of information, the bulkier is the medium; the required pieces of the information cannot be swiftly accessed; and the remarks or comments written on it cannot be directly utilized by electronic processing means. Especially, with paper medium, it is difficult to edit, for example, to expand or contract the images on it, or to change the color of such images. Further, when the sheets of paper on which collected or edited images are printed are to be circulated, physical distribution means such as handing-over or mailing must be employed, requiring some labor and time. This leads to a problem.

To solve this problem, there has been proposed a method wherein images printed on paper are electronically taken into an electronic computer by the use of an image capturing apparatus such as an optical scanner and then edited electronically by using a graphic software. According to this method, once the images printed on the paper have been taken in the computer, all the editing operations such as expanding and contracting images are performed in the computer. Consequently, it has become possible to duplicate, expand and contract the captured images and even to change the colors of the images. Moreover, it has become possible to electronically organize the edited images as image files and to print those image files, if necessary, onto paper by means of, for example, a printer. Further, it has also become possible to transmit images easily, swiftly and at low cost through electronic image transmission techniques such as attaching images to e-mails and distributing images by means of a Web server. An optical scanner, a CCD camera, or a stand type scanner can be used as an image capturing apparatus in this conventional method.

Non-Patent Document 1: Nikkei Electronics, Jul. 21, 2003, pp. 114-122

DISCLOSURE OF INVENTION

Problem to be Solved by the Invention

With the conventional method described above, however, since all the image editing operations are performed in the computer, there has been a problem that the pleasure of this electronic image editing is inferior to that of actually editing images manually by using paper. This problem is hereafter referred to as the "first problem". Indeed the electronic image editing in the computer allows the duplication, expansion and contraction of images to be performed through easy manipulations such as the click of a key on the keyboard or the drag and drop action by the mouse, but such operations within the computer, with a difficulty in viewing all the images to be edited, i.e. a limited display of the images on a monitor, are inferior in real-world feeling to the manual editing wherein a plurality of paper sheets are put on a table for manipulation.

Further, with the conventional method, there need be an awkward operation that all the images to be edited must be taken in the computer in advance of actual editing. This may constitute a problem and therefore it is hereafter referred to as the "second problem". Since an editing operation requires a trial and error process, it is a considerable labor to take in beforehand all the images expected to be edited.

This invention has been made just to solve these problems.

The first subject of this invention aimed to solve the first problem mentioned above is to provide a novel image processing apparatus capable of enjoying the two merits: one is the handiness and visibility of paper and the other is the multi-functionality of a computer.

The second subject of this invention aimed to solve the second problem mentioned above is to provide an image processing apparatus having a high operational efficiency, wherein a trial and error process can be effected on images appearing on paper media without taking in beforehand all the images expected to be edited.

Means for Solving Problems

According to this invention, to solve the first problem mentioned above, there is provided an image processing apparatus comprising an image capturing unit for electronically capturing images on a paper sheet by means of a photo-sensor; an image editing unit for performing image editing such as clipping parts of an image, and expanding or contracting original images; a user interface unit for receiving and executing user's commands relating to the image editing; an image memory unit for storing the images captured by the image capturing unit and the images obtained through processing by means of the image editing unit; and an image display unit for displaying the images stored in the image memory unit, wherein the plane surface of a transparent substrate is provided with an image displaying function, a plurality of photo-sensors are flatly distributed over the plane surface, and the image capturing unit and the image display unit are integrated together to form an image capturing and display unit, so that a user can enjoy a high operability well compatible with human feeling of naturalness, irrespective of whether the image carrying medium is paper or an electronic medium.

Further, to solve the second problem mentioned above, there is provided an Augmented Reality (AR) operation wherein the transparent image capturing and display unit is placed in close contact on the images on a paper sheet and thereby the image on the paper sheet and an electronic image stored in the image processing apparatus can be displayed in superposition on the transparent image capturing and display unit so that a trial and error process can be effected on the images appearing on the transparent image capturing and display unit without capturing beforehand all the images on paper sheets that are expected to be edited.

The detailed description of the basic structure according to this invention is as follows. The image processing apparatus of this invention comprises a plate member having a first plane and a second plane opposite to the first plane, and an image capturing and display layer having thereon an image capturing section for converting the light emanating from the image to be captured and impinging on to the first plane, into an electrical signal to be used as image data and an image displaying section for displaying the image data thereon, wherein both the image to be captured and the image data can be simultaneously viewed from the side of the second plane.

For example, in the image capturing and display layer are disposed in plane configuration a plurality of pixels, each pixel comprising an image display element and a photo-sensing element. A light-blocking film is preferably disposed on that surface of each photo-sensing element which faces the second plane so that only the light coming from the side of the first plane can be selectively detected by the photo-sensing element. The transparency of the plate member can be enhanced either by making at least a part of each pixel light-transmittable by removing portion of the interlayer insulation film or by using a particular pixel as a light-passing area where no element is formed.

The pixel which takes in the image data as input can be selected by sending signals through the gate line and the signal line both connected with the pixel. The provision of a memory for storing the image data will facilitate the editing operation on the obtained image data.

Another embodiment of this invention is an image processing apparatus comprising a transparent plate, memories and an information processing device, wherein the transparent plate has thereon an image capturing and display layer provided both with an image capturing unit for capturing an target image and converting the captured image to image data and for storing the image data in the memories and with an image display unit for displaying thereon the image data stored in the memories; and a user interface layer for defining a selected area on the transparent plate, and wherein when a particular area of the user interface layer is selectively defined, the information processing device will have:
(1) a function of storing the image data obtained as a result of capturing an image within the defined area,
(2) a function of specifying the data being displayed in the defined area, and
(3) a function of relating the stored data to the displayed data.

With this constitution, a user can handle alike the images viewed through the transparent plate (e.g. a photograph placed beneath the transparent plate) and the images displayed on the image display unit on the transparent plate.

It is preferable that the above mentioned functions (1) through (3) should be executed in response to the defining of a selected area in the user interface layer and the input action by an icon or a button. For example, by encircling a predetermined area on the transparent plate with a stylus pen after (of before) pressing the image synthesis button (or icon), can be carried out a process for relating (e.g. combining) the image viewed through the predetermined area on the transparent plate (e.g. a photograph placed beneath the transparent plate) to the image being displayed on the image display unit of the transparent plate. It is also possible to omit the operation of defining a desired area and instead to save/specify and process the whole image viewed through the entire surface of the transparent plate. This process is, in other words, equal to making the defined area of the entire screen.

Advantages of the Invention

According to this invention, a user can perform an image editing operation compatible with human intuition without being conscious of the difference between paper and electronic medium. Thus, the user can enjoy (1) an improved work efficiency and (2) an improved quality in image editing due to helping perform a trial and error manipulation.

BEST MODE FOR CARRYING OUT THE INVENTION

Figure 1:
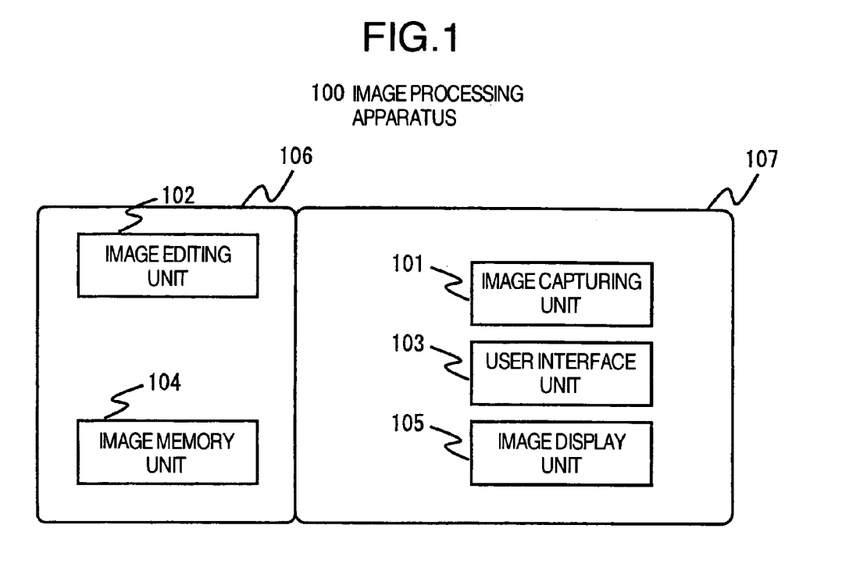
FIG. 1 schematically shows the basic structure of an image processing apparatus according to this invention.

The basic structure of an image processing apparatus according to this invention will now be described with reference to FIG. 1.

An image processing apparatus 100 comprises an image capturing unit 101 for electronically capturing images on a paper sheet by means of a photo-sensor; an image editing unit 102 for performing image editing such as clipping a part of the captured image, and expanding or contracting the captured images; a user interface unit 103 for receiving and executing user's commands relating to the image editing; an image memory unit 104 for storing the images captured by the image capturing unit and the images obtained through processing by means of the image editing unit; and an image display unit 105 for displaying the images stored in the image memory unit.

According to one embodiment of this invention, the image processing apparatus 100 comprises a transparent plate 107 including the image capturing unit 101, the user interface unit 103 and the image display unit 105; and a substrate 106 including the image editing unit 102 and the image memory unit 104.

The image editing unit 102 can be realized as a hardware dedicated to image processing or a software dedicated to image processing and operating on a general purpose CPU. Volatile or non-volatile memory elements can be used for the image memory unit 104. Such memory elements may be provided outside the image processing apparatus so as to serve as an additional memory system.

Figure 2:
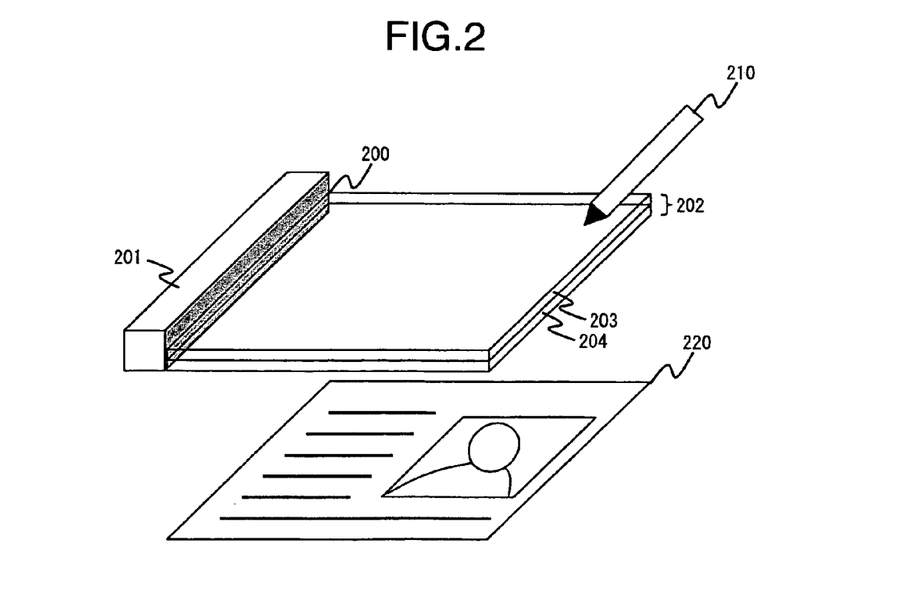
FIG. 2 is a perspective view of an image processing apparatus as an embodiment of this invention.

FIG. 2 shows the basic structure of an embodiment of this invention. An image processing apparatus 200 consists of a main section 201 and a screen section 202. The image editing unit 102 and the image memory unit 104 as shown in FIG. 1 are mounted on the main section 201. The screen section 202 consists of two transparent plain layers. The upper layer 203 serves as a user interface layer and the lower layer 204 serves as an image capturing and display layer. The user interface layer 203 corresponds basically to the user interface unit 103 as shown in FIG. 1, and can detect the position at which a stylus 210 contacts the surface of the user interface layer 203. The image capturing and display layer 204 corresponds to the combination of the image capturing unit 101 and the image display unit 105, as shown in FIG. 1. The details of this image capturing and display layer 204 will be described later. The screen section 202 will be referred to hereafter simply as the "screen".

In actual use, the image processing apparatus 200 is first placed on a sheet of paper 220 on which images to be captured appear. Such an image editing operation as area definition is performed by using a stylus 210. The locus of the tip of the stylus 210 is detected by the user interface layer 203, and the image editing unit of the main section 201 interprets what is meant by the locus and performs respective image editing operations accordingly. If the images appearing on a paper sheet 220 must be captured during the editing process, the image capturing and display layer 204 is to capture the image within the defined area on the paper 220.

The image capturing and display layer will now be described in detail.

Figure 5:
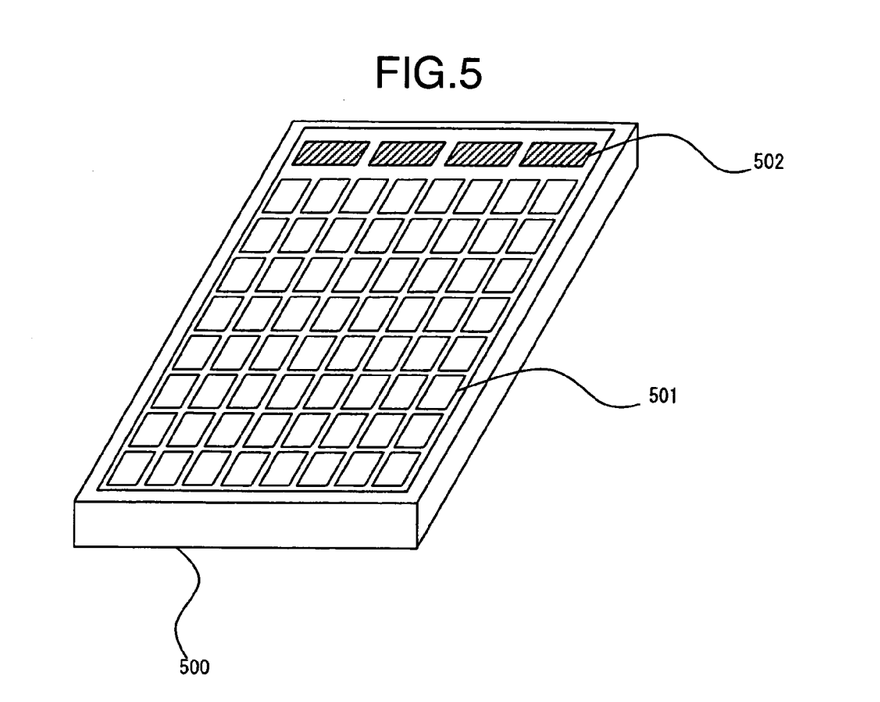
FIG. 5 schematically shows a simplified structure of an image capturing layer used in one mode of this invention.

FIG. 5 schematically shows a simplified structure of an image capturing and display layer. Pixels 501, each having an image capturing function and an image display function, are flatly distributed on a transparent substrate 500 having a diagonal length of about 200 mm and a thickness of about 2 mm. Sixty four pixels are shown appearing on the substrate 500 for simulation purpose in FIG. 5. In reality, however, a far greater number of pixels arranged at an interval of about 40 µm are employed to form an image capturing and display layer.

Figure 6:
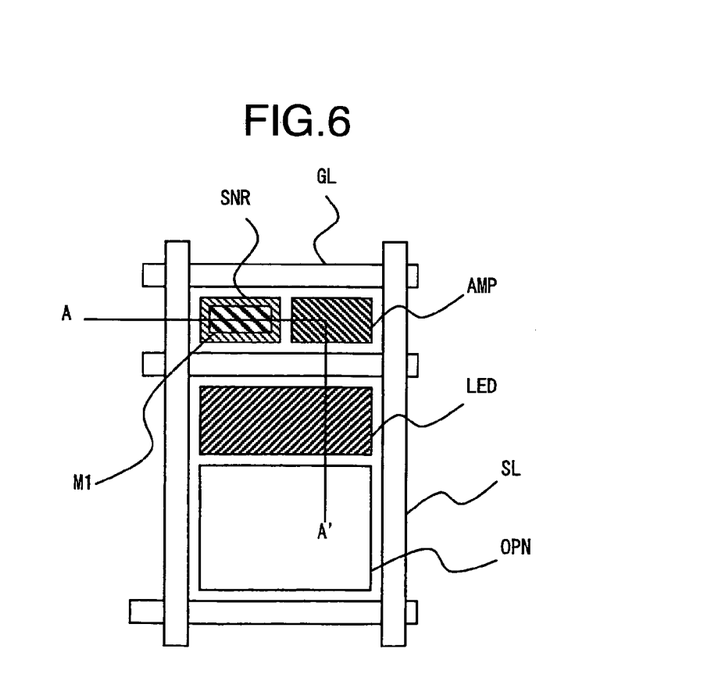
FIG. 6 shows in plan the layout of the picture elements (or pixels) on the image capturing layer used in one mode of this invention.

FIG. 6 shows in plan the layout of the pixel 501 on the image capturing and display layer. A thin film photo-diode (photo-sensor) SNR of polycrystalline silicon, a light-blocking film M1 of aluminum (Al), a signal converting and amplifying circuit AMP of polycrystalline silicon TFT, a light emitting element LED such as a light emitting diode of organic semiconductor, and a transparent window OPN are packed in each of the areas enclosed by a plurality of gate lines GL and a plurality of signal lines SL intersecting them perpendicularly.

Figure 7:
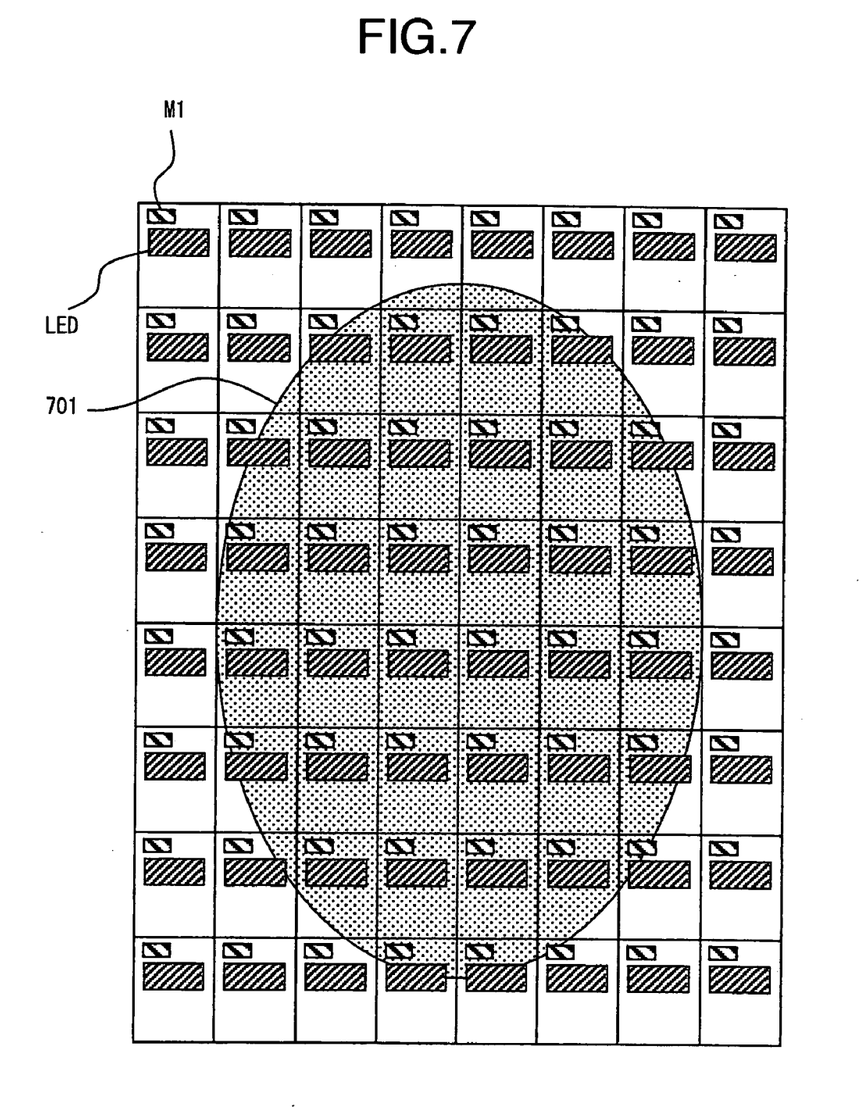
FIG. 7 conceptually shows the superposition of a picture on a paper sheet to be captured and the pixels distributed on the image capturing layer used in one mode of this invention.

FIG. 7 illustrates how an elliptical pattern 701 on a sheet of paper is image-captured by using the image capturing and display layer. A photo-sensor, a light-blocking film, an amplifier and a light emitting element are disposed in each of the 64 simulation pixels. Since the polycrystalline silicon films forming the photo-sensor and the amplifier and the wiring conductors are nearly transparent, the image on the paper can be seen through the area except the light-blocking film M1 and the light emitting element LED. In image capturing, the image to be captured is recognized by those pixels whose light-blocking films M1's are covered by the elliptical pattern.

Figure 8:
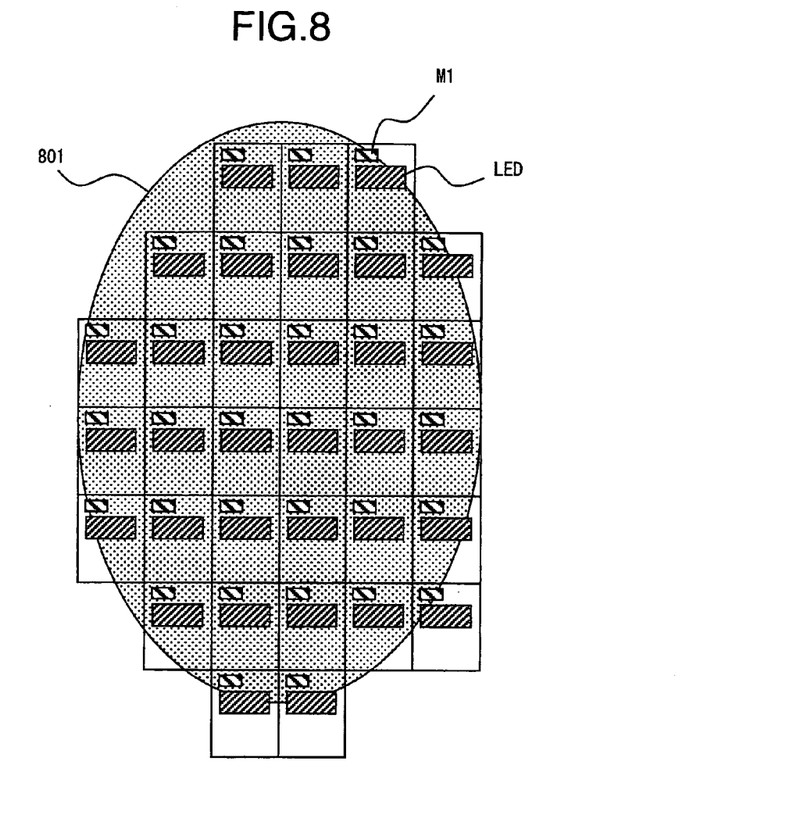
FIG. 8 conceptually shows the superposition of a picture on a paper sheet to be captured and those pixels on the image capturing layer which recognizes the picture to be captured.

FIG. 8 shows the pixels which actually recognize the elliptical pattern.

Figure 9:
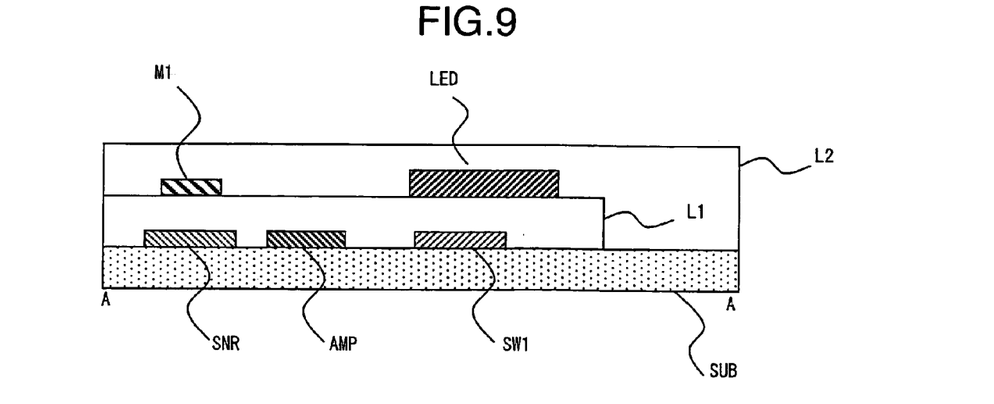
FIG. 9 shows in vertical cross section one of the pixels distributed on the image capturing layer used in one mode of this invention.

The structure of the image capturing and display layer embodying this invention will now be described in some detail. FIG. 9 is a cross sectional view taken along line A-A' in FIG. 6. On a transparent substrate SUB are mounted a thin film photo-diode SNR of polycrystalline silicon, a light-blocking film M1, a signal converting and amplifying circuit AMP of polycrystalline silicon TFT, a light emitting diode LED of organic semiconductor, and a switch SW1 of polycrystalline silicon TFT for driving the light emitting diode LED of organic semiconductor. That portion of the interlayer insulation film L1 which overlaps the transparent area OPN is removed.

In image capturing by the image capturing and display layer, the transparent substrate SUB is first placed in close contact on the paper bearing the image to be captured. External light impinges on a protective film L2, is reflected from the surface of the printed matter, and finally reaches the photo-diode SNR. Since the light-blocking film M1 blocks that light which impinges from the side of the protective film L2 directly onto the photo-diode SNR, photo-carriers are generated in the photo-diode in response to the intensity of the light reflected solely from the paper surface. By applying an voltage to selected pairs of gate line GL and signal line SL, pixels to capture the required image can be selected. In the selected pixels, the photo-carriers generated in the associated photo-diodes are amplified by the corresponding amplifying circuits AMPs. By repeating similar operations with the adjacent pixels, the selected image can be captured in the form of two-dimensional electric signal.

For the image capturing and display layer to display an image, an arbitrary image can be visualized by controlling the light emissions from the respective light emitting diodes LEDs through altering the voltages applied to the diodes LEDs by means of the circuit switches SW1s of polycrystalline silicon.

The foregoing is the description of the structure and operation of the image capturing and display layer.

Image editing operations with the image capturing and display layer as described above will now be explained.

Figure 3:
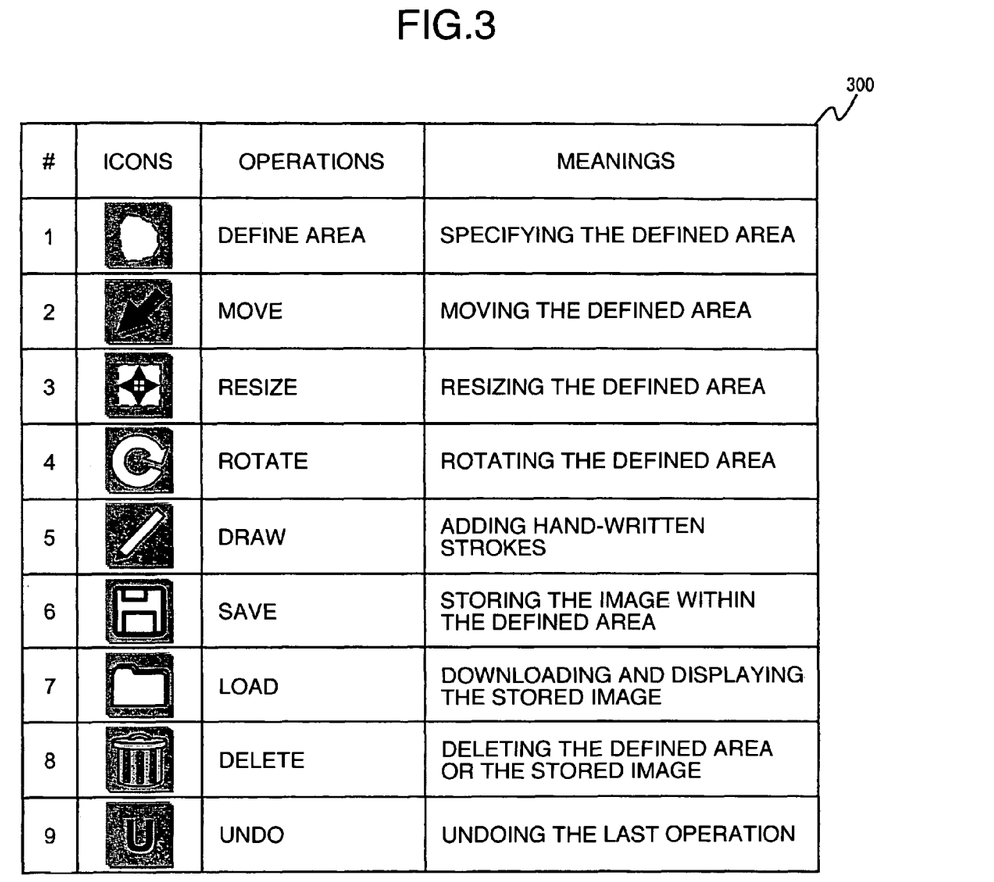
FIG. 3 is a list of image editing operations available in one mode of this invention.
Figure 4:
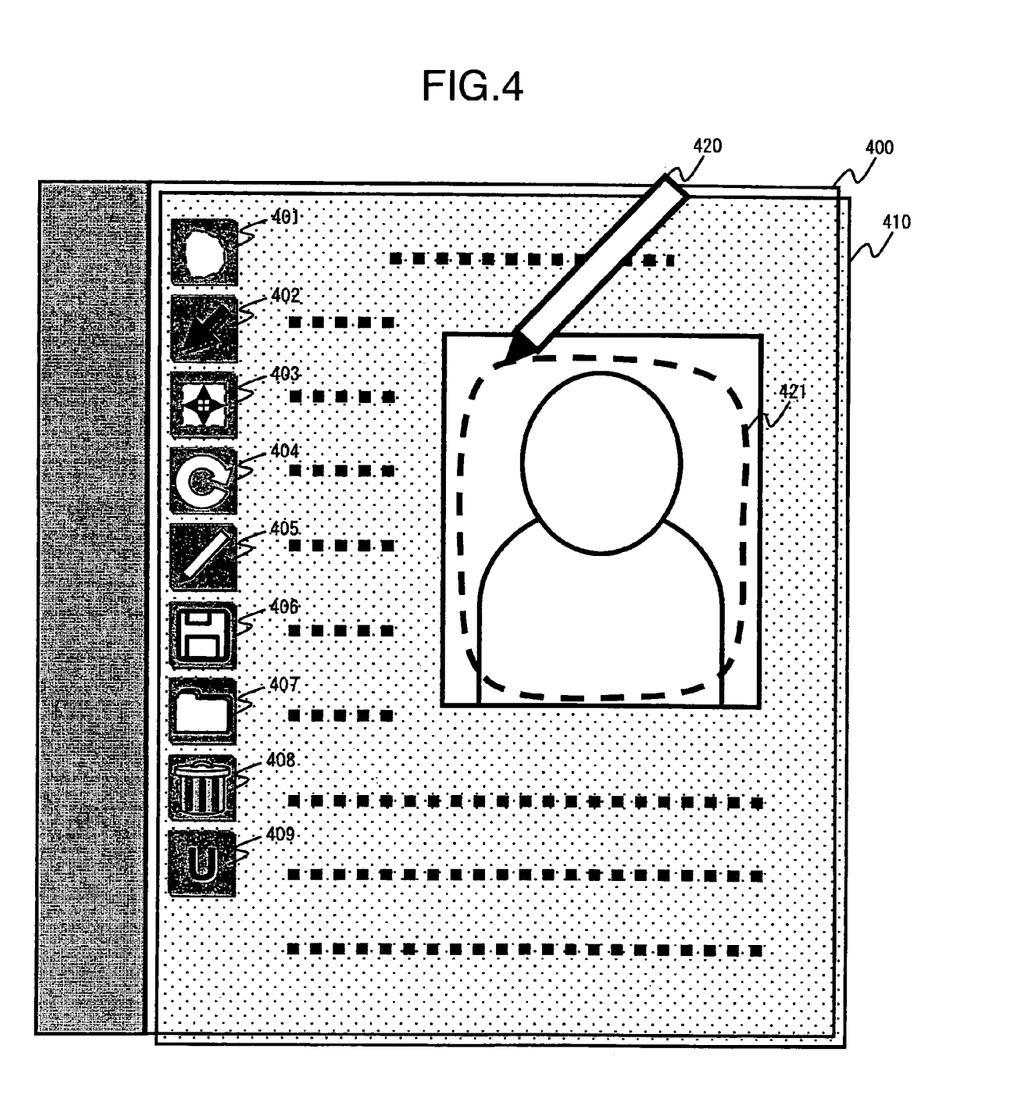
FIG. 4 illustrates in plan the image editing operations, especially the area defining operation, according to one mode of this invention.

FIG. 3 is a list of image editing operations available in one mode of this invention;

FIG. 4 illustrates in plan the image editing operations, especially the area defining operation, according to one mode of this invention;

The list of image editing operations will first be described with reference to FIG. 3. In this embodiment, nine image editing operations as a whole are available. Icons indicating those nine editing operations are displayed vertically near the left side of the screen as shown in FIG. 4. A user touches with a stylus 420 the icon corresponding to the editing operation he/she wants to perform. Then, the required image editing operation is recognized by the image processing apparatus.

Individual image editing operations will now be described. The operation to "define" the area which any particular editing operation covers is called "area defining" indicated by an icon 401. To define such an area, the user directly specifies such an area on the upper surface of the image processing apparatus by using a stylus, as depicted by the circling line 421 shown in FIG. 4. If there is no defined area specified, the image editing operation is performed over the entire area on the upper surface of the image processing apparatus.

The editing operation to "move" the image within the defined area over the screen is called "moving" operation indicated by an icon 402. After specifying such a "moving" operation by using the stylus, the user can drag the defined area to an arbitrary position on the screen by using the stylus. Images that can be moved may be either images on a paper sheet or electronic images being displayed on the screen. In case of moving an image on a paper sheet over the screen, the "moving" operation is first commanded and then the image on a paper sheet within the defined area is captured as a piece of electronic image information. The piece of electronic image information is in turn displayed as an electronic image in a selected area on the screen. The electronic image can now be moved over the screen in response to the movement of the stylus. During this process of moving, that area of the screen which is not displaying the electronic image is transparent and other images on the paper sheet can be seen through the transparent area. Consequently, with this image processing apparatus, the user feels as if he/she clipped the defined area from the paper and moved the clipped, defined area over the paper beneath.

The editing operation to "resize", i.e. to expand or contract the image within a defined area is referred to as "resizing" operation as indicated by an icon 403. Images that can be expanded or contracted may be either images on a paper sheet or electronic images, just as in the "moving" operation.

The editing operation to "rotate" the image within a defined area on the screen is referred to as "rotation" as indicated by an icon 404. This "rotation" or rotational operation can also be applied to either images on a paper sheet or electronic images.

The editing operation to allow a user to freely "draw" or write down his/her notes or comments near an electronic image displayed on the screen, is referred to as "drawing" operation as indicated by an icon 405. An interface may be provided which can specify the color, width, type (solid or dotted line) of the strokes written in through this "drawing" operation. The detailed description of such a interface is omitted here.

The editing operation to store or "save" the electronic image within a defined area in the image memory unit is referred to as "saving" operation as indicated by an icon 406. For its later use or searching, the saved image may preferably be electronically tagged with a specific file name or a label indicative of the nature of the image, or may be subjected to the hierarchical file organizing scheme commonly used in the computer operating system. In this embodiment, however, a file including the date and time at the moment of saving the image is automatically created and used as such an electronic tag.

The editing operation to "load" onto the screen the electronic image saved in the image memory unit is referred to as "loading" operation as indicated by an icon 407. There may be provided, in this procedure, an artifice to help a user search the intended image by the use of a preview list.

The editing operation to "delete" the image within the defined area is referred to as "deleting" operation as indicated by an icon 408. A certain image listed in the preview list displayed on the screen in the downloading operation, can be selected and then deleted from the image memory unit through this deleting process.

The editing operation to "undo" the last performed operation and restore the whole system to the previous state is referred to as "undoing" operation as indicated by an icon 409. For this operation to be effected, the sorts of operations performed in the past are all memorized or saved in the image memory unit. If the "undoing" operations are repeated N times, the state of the system retrogrades N stages to the past.

As described above, with the image processing apparatus according to this invention, as the image capturing operation will be implicitly performed only when there is a need to do so, there is no need of specifying an "image capturing" operation. Since no user explicitly experiences an awkward manipulation of separately converting images on a paper sheet into electronic images beforehand, there will be provided an handy image processing apparatus with a high operability well compatible with human feeling of naturalness.

Figure 10:
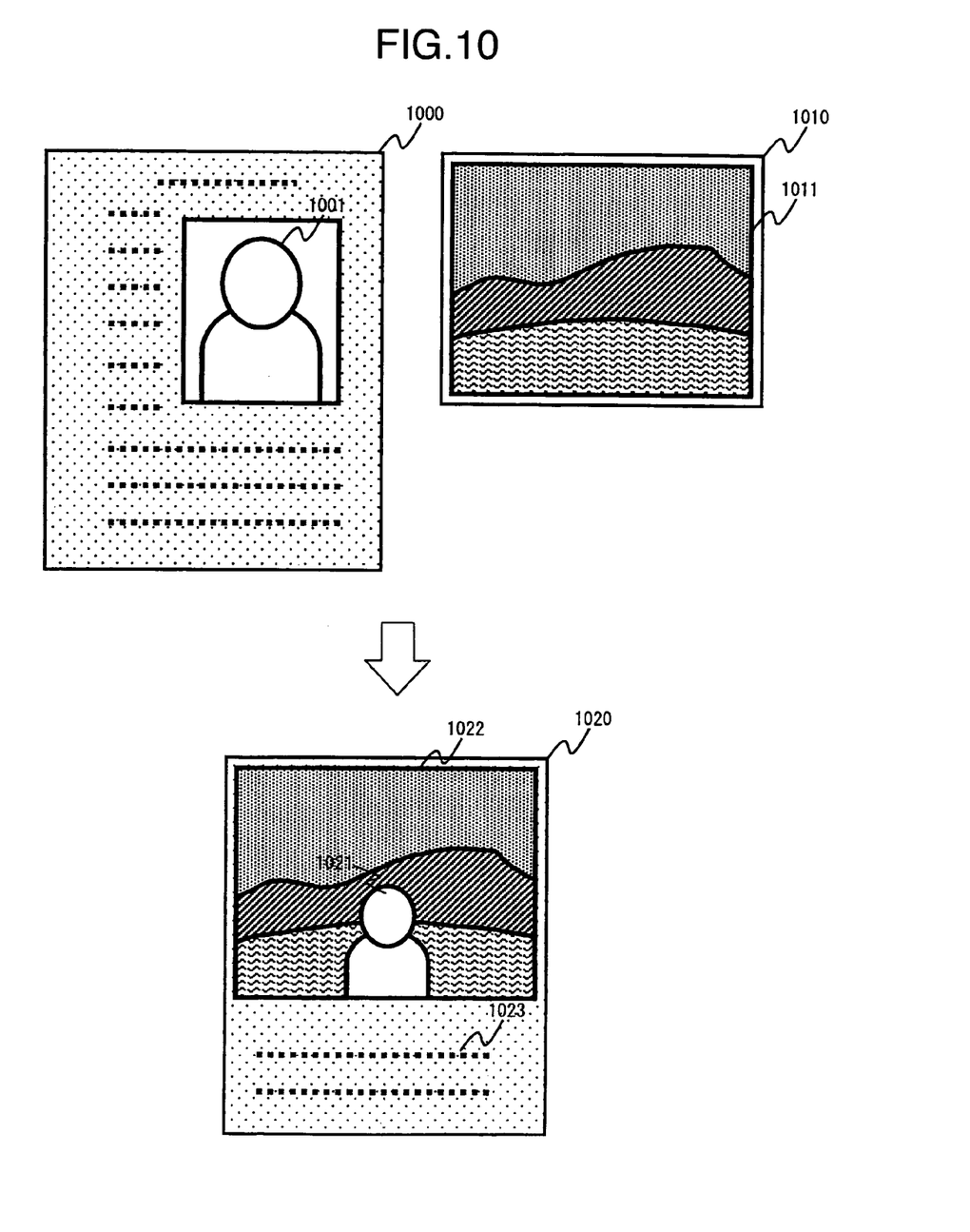
FIG. 10 conceptually shows an example of image editing operations in one mode of this invention.

FIG. 10 conceptually shows an example of image editing operations in one mode of this invention. In this embodiment, it is assumed to create a composite image 1020 wherein the picture of a person 1001 appearing on an original document 1000 and the natural scene 1011 of a photograph 1010 are combined together, with a hand-written memo 1023 jotted down nearby therein.

The process of capturing the picture of the person will first be described. As shown in FIG. 4, an image processing apparatus 400 is placed on an original document 410 and the icon 401 is touched with a stylus 420 so as to specify "defining area". Then, the area 421 on the original document covering the picture of a person is defined by using a stylus. As a result of this operation, the picture of the person is automatically captured in the image processing apparatus and the captured picture is then converted to an image object to be temporarily stored in the image memory unit.

Figure 11:
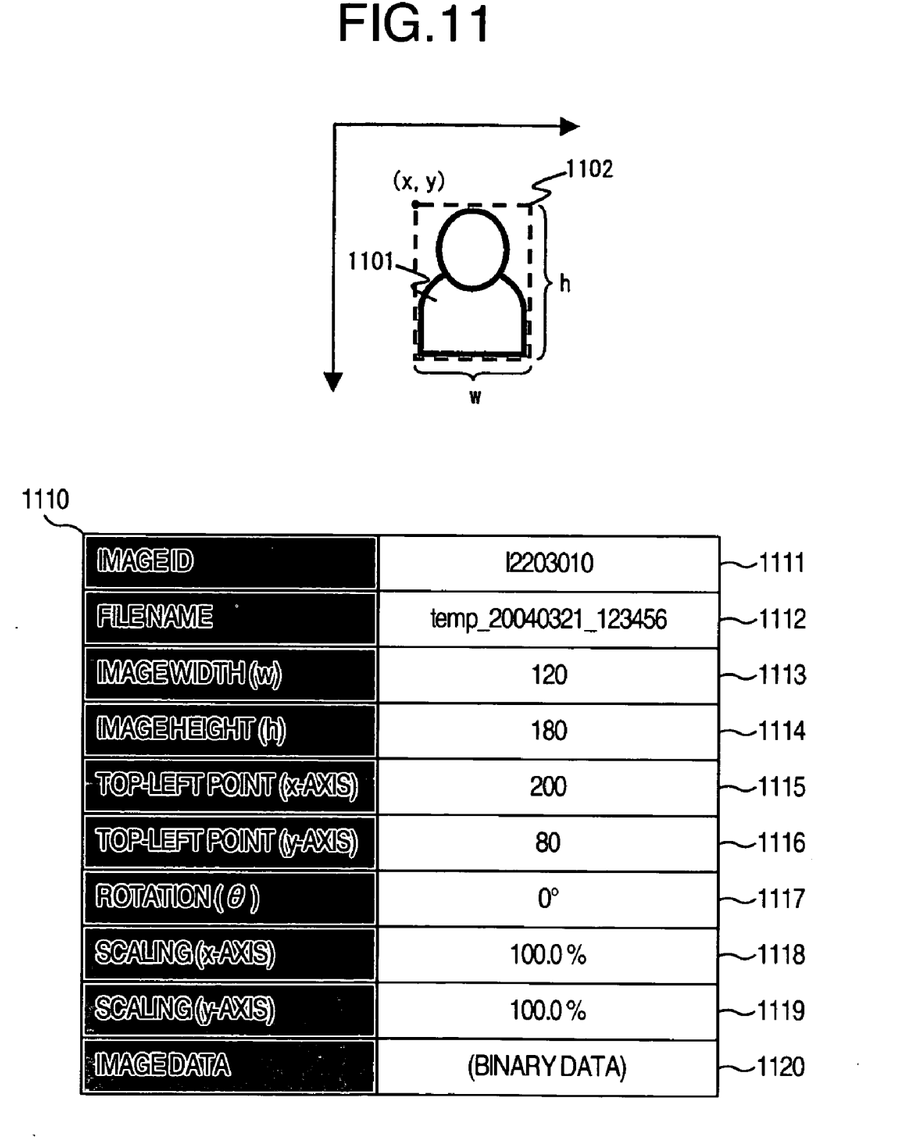
FIG. 11 schematically shows the structure of data relating to an image object used in one mode of this invention.

Here, description will be made of the image object mentioned above. As shown in FIG. 11, the image object takes a data structure as represented in the table 1110. The image ID (1111) denotes an ID mechanically allocated to an image object when the image object is created. The ID is unique to each image object. The file name 1112 is the name of an electronic file which includes the data representing the image object and is stored in the image memory unit. This file name, as described above, is automatically created depending on the date and time at the moment of creating the image object. The image captured temporarily on the screen without being subjected to the "saving" operation will have its file name preceded by a prefix "temp_" meaning that the thus prefixed file is a temporary file. The image width 1113 and the image height 1114 are respectively the width and the height of a rectangle 1102 that circumscribes the image object 1101. The last item 1120 of the image data represents the luminance value of an individual pixel as a binary code. Those values associated with the image object which are mentioned above are independent of what is displayed on the screen and are invariable. The other values represented as the data items 1115 to 1119 of the image object are related to the display of the image object and therefore varied in response to the manipulation by a user. The data items 1115 and 1116 represent the values corresponding to the abscissa and the ordinate of the top-left point of the circumscribing rectangle 1102, respectively. These values changes when the "moving" operation is performed. The data item 1117 represents in degree the angle through which the original image has been rotated clockwise. This angular value changes when the "rotating" operation is performed. The data items 1118 and 1119 represent the horizontal and vertical scale factors, respectively, for the circumscribing rectangle for the original image object and therefore are varied when the "resizing" operation is performed. The thus electronically formed image is stored as an image object in the image memory unit.

Figure 12:
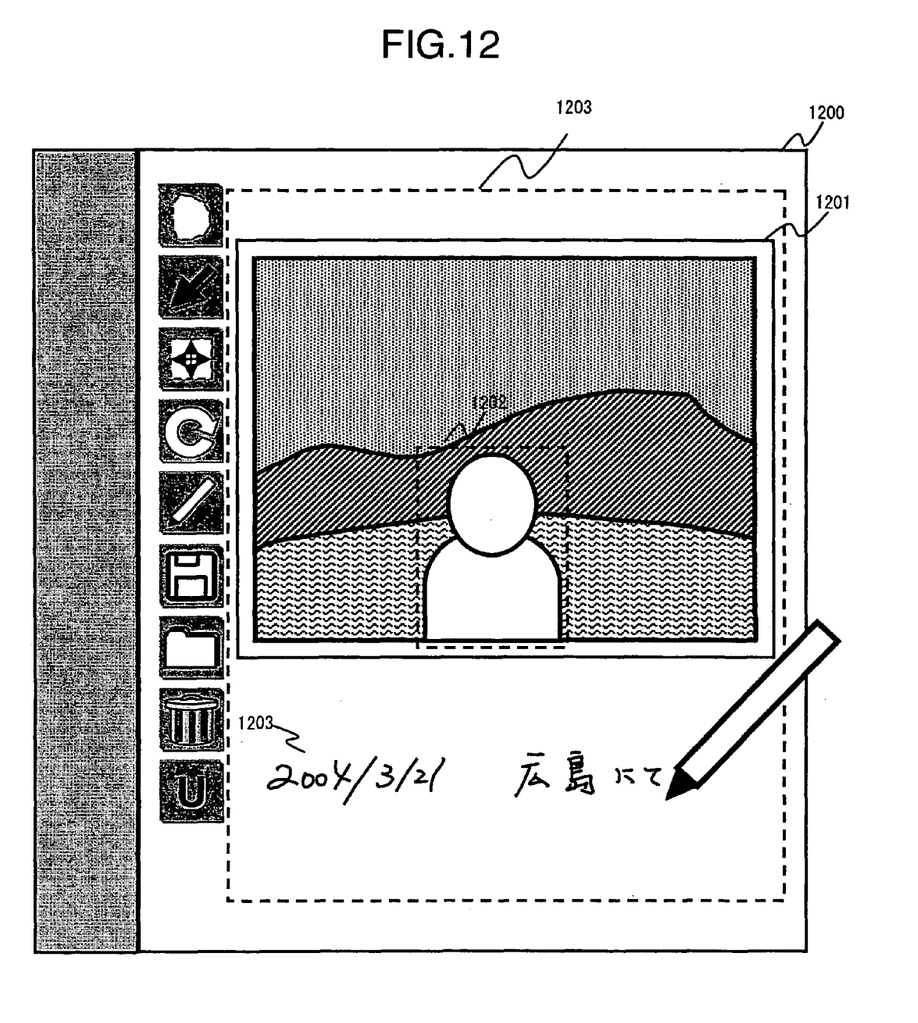
FIG. 12 conceptually shows the image editing operations in one mode of this invention, especially how the movement, expansion and contraction of images and the handwriting operation are performed.

The "moving", "resizing" and "drawing" operations will now be described with reference to FIG. 12, following the operation described with reference to FIG. 10. How to combine the captured picture 1001 of the person and the scene 1011 in the photograph 1010, will first be described in reference to FIG. 12. The captured picture 1001 of the person has already been stored in the image memory unit as a result of the previous operation and is being displayed as an image object on the screen of the image processing apparatus. Another picture 1201 to be next processed is placed beneath the screen of the image processing apparatus. The user moves the image object of the person to a desired position on the picture 1201 where the image of the person is combined with the scene in the picture 1201. Then the moved object is subjected to the "resizing" operation to expand or contract the object as the user pleases, as indicated at numeral 1202. After this the "drawing" operation is performed to add a hand-written memo to the combined image. Finally, the area 1203 desired to save is defined and saved to obtain an image 1020 as shown in FIG. 10.

Through the operation of saving the specified image within the defined area, the user can save any images appearing on the screen of the image processing apparatus 1200 irrespective of whether they are a real photograph 1201, or a data image 1202 or 1203 displayed on the screen. Throughout the above process taking place in the image processing apparatus, the capturing of the image (photo 1202) within the area 1203 and the combining of the captured image and the displayed images 1202 and 1203, are carried out continuously. Actually, the image capturing is performed, as described with reference to FIG. 4, by organizing the signals from the photo-sensors distributed within the defined area 1203 into corresponding data which are stored in the image memory unit. The image processing apparatus 100 recognizes the images 1202 and 1203 displayed in the coordinate plane within the defined area, takes in the image data for these images, and renews the old coordinate data with the new ones. These series of operations are achieved by, for example, the image editing unit 102 (e.g. CPU) and the image memory unit 104 (e.g. DRAM) as shown in FIG. 1.

Figure 13:
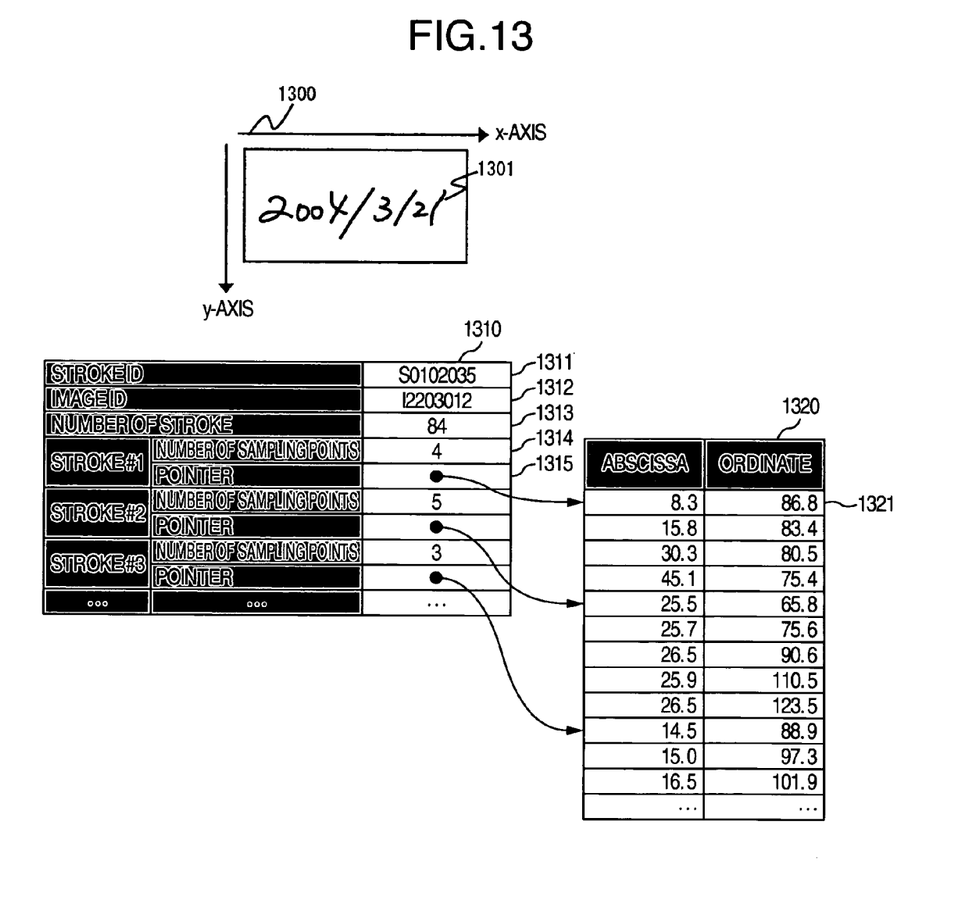
FIG. 13 schematically shows the structure of data relating to strokes in handwriting.

FIG. 13 shows the data structure associated with strokes constituting hand-written information. The stroke information 1310 comprises such data items as the ID 1311 of an individual piece of stroke information, the ID 1312 of the image in which the stroke of interest is contained, the total number 1313 of strokes constituting the stroke information, the number 1314 of sampling points contained in each stroke, and the pointer 1315 to specify each stroke. Each pointer corresponds to a representative one of the sampling points 1321 constituting the sampling point information 1320. Each stroke is characterized by its pointer and the number of sampling points. Namely, the pointer indicates the initial sampling point for the stroke of interest and the number of sampling points specifies the number of the remaining sampling points contributing to the same stroke.

The following is the description of reference numerals.
100: image processing apparatus, 101: image capturing unit, 102: image editing unit, 103: user interface unit, 104: image memory unit, 105: image display unit, 201: main section of image processing apparatus, 202: screen section of image processing apparatus, 203: user interface layer, 204: image capturing and display layer, 210: stylus, 220: paper sheet bearing images to be processed, 300: list of editing operations, 401~409: icons corresponding to respective editing operations, 421: area containing images to be processed, 501: images appearing on image capturing and display layer, GL: gate lines, SL: signal lines intersecting perpendicularly with gate lines, SNR: thin film photodiode (photo-sensor) of polycrystalline silicon, M1: light-blocking film of aluminum (Al), AMP: signal converter and amplifier of polycrystalline silicon TFT, LED: light emitting element or diode of organic semiconductor, OPN: transparent area SUB: transparent substrate, SW1: polycrystalline silicon TFT circuit for driving LED, L1: interlayer insulation film, L2: protective film

INDUSTRIAL APPLICABILITY

The image processing apparatus according to this invention can be utilized in a variety of fields ranging from the purpose of business such as in helping graphic designers perform image editing operations to the personal purpose such as of clipping interesting pieces of news or compiling picture diaries.

The invention claimed is:

1. An image processing apparatus comprising an image capturing unit for electronically capturing images on a paper sheet by means of a photo-sensor; an image editing unit for performing image editing including clipping parts of an image and expanding or contracting the original images; a user interface unit for receiving and executing user's instructions relating to the image editing; an image memory unit for storing the images captured by the image capturing unit and the images obtained through processing by means of the image editing unit; and an image display unit for displaying the images stored in the image memory unit, wherein a transparent image capturing and display unit is constituted by combining the image capturing unit formed by disposing a plurality of photo-sensor elements on the plane surface of a transparent substrate with the image display unit formed by disposing a plurality of image display elements on the plane surface of the transparent substrate, so that the images on the paper sheet placed beneath the transparent image capturing and display unit can be directly viewed through the transparent image capturing and display unit, and wherein the image stored in the image memory unit is displayed on the image capturing and display unit to superpose the displayed image on the image on the paper sheet seen through the transparent image capturing and display unit.

2. An image processing apparatus as claimed in claim 1, wherein an image capturing, display and manipulating unit is formed by combining the image capturing and display unit and a user interface unit together.

3. An image processing apparatus as claimed in claim 2, wherein instead of forming the image capturing and display unit or the image capturing, display and manipulating unit on the plane surface of the transparent substrate so as to see the image on the paper sheet through the unit, the pixel information obtained by capturing the image on the paper sheet by means of photo-sensor elements is sent to the image display elements corresponding to the photo-sensor elements to be displayed on the image display elements so that a pseudo-transparency effect can be obtained.

4. An image processing apparatus as claimed in claim 1, wherein instead of forming the image capturing and display unit or the image capturing, display and manipulating unit on the plane surface of the transparent substrate so as to see the image on the paper sheet through the unit, the pixel information obtained by capturing the image on the paper sheet by means of photo-sensor elements is sent to the image display elements corresponding to the photo-sensor elements to be displayed on the image display elements so that a pseudo-transparency effect can be obtained.

5. An image processing apparatus comprising a plate member having a first surface; a second surface opposite to the first surface; and an image capturing and display layer comprising an image capturing unit for converting the light reflected from the image to be captured and impinging onto the first surface into electrical signal and for taking in the electrical signal as image data, and an image display unit for displaying the image data thereon; wherein the image to be captured and the image data can be seen in superposition from the side of the second surface.

6. An image processing apparatus as claimed in claim 5, wherein a plurality of pixels, each having an image display element and a photo-sensor element, are disposed in a plane configuration on the image capturing and display layer.

7. An image processing apparatus as claimed in claim 6, wherein a light-blocking film is disposed over the photo-sensor element on the side of the second surface.

8. An image processing apparatus as claimed in claim 6, wherein at least a part of each pixel serves as a light-transmitting area devoid of interlayer insulation film.

9. An image processing apparatus as claimed in claim 6, wherein at least a part of serves as a light-transmitting area devoid of any functional element.

10. An image processing apparatus as claimed in claim 6, wherein each pixel is connected with a gate line and a signal line and particular pixels to take in the image data are selected by sending signals to the gate and signal lines associated with the particular pixels.

11. An image processing apparatus as claimed in claim 5, further comprising memories for storing the image data.

12. An image processing apparatus comprising a transparent plate, memories and information processing devices, wherein the transparent plate has thereon an image capturing and display layer provided with an image capturing unit for capturing an target image and converting the captured image to image data and for storing the image data in the memories and with an image display unit for displaying thereon the memory data stored in the memories; and a user interface layer for defining a selected area on the transparent plate, and wherein when a particular area of the user interface layer has been selectively defined, the information processing devices will have (1) a function of storing the image data obtained as a result of capturing an image within the defined area, (2) a function of specifying the data being displayed in the defined area, and (3) a function of relating the stored data with the displayed data.

13. An image processing apparatus as claimed in claim 12, wherein the functions (1) through (3) are performed when a specific area is defined on the user interface layer and when an input action is initiated by the actuation of an icon or a button.

14. An image processing apparatus as claimed in claim 12, wherein a plurality of pixels, each having an image display element and a photo-sensing element, are flatly disposed on the image capturing and display layer.

15. An image processing apparatus as claimed in claim 12, wherein the transparent plate has a first surface and a second surface opposed to the first surface, is so constructed that a target image placed on the side of the first surface can be seen from the side of the second surface, and has a function of defining a specific area on the second surface by means of a stylus pen.

* * * * *